C. W. CLARK.
COMBINED MOTOR TRUCK AND PLOW.
APPLICATION FILED JAN. 6, 1911.
1,080,749.
Patented Dec. 9, 1913.
2 SHEETS—SHEET 1.
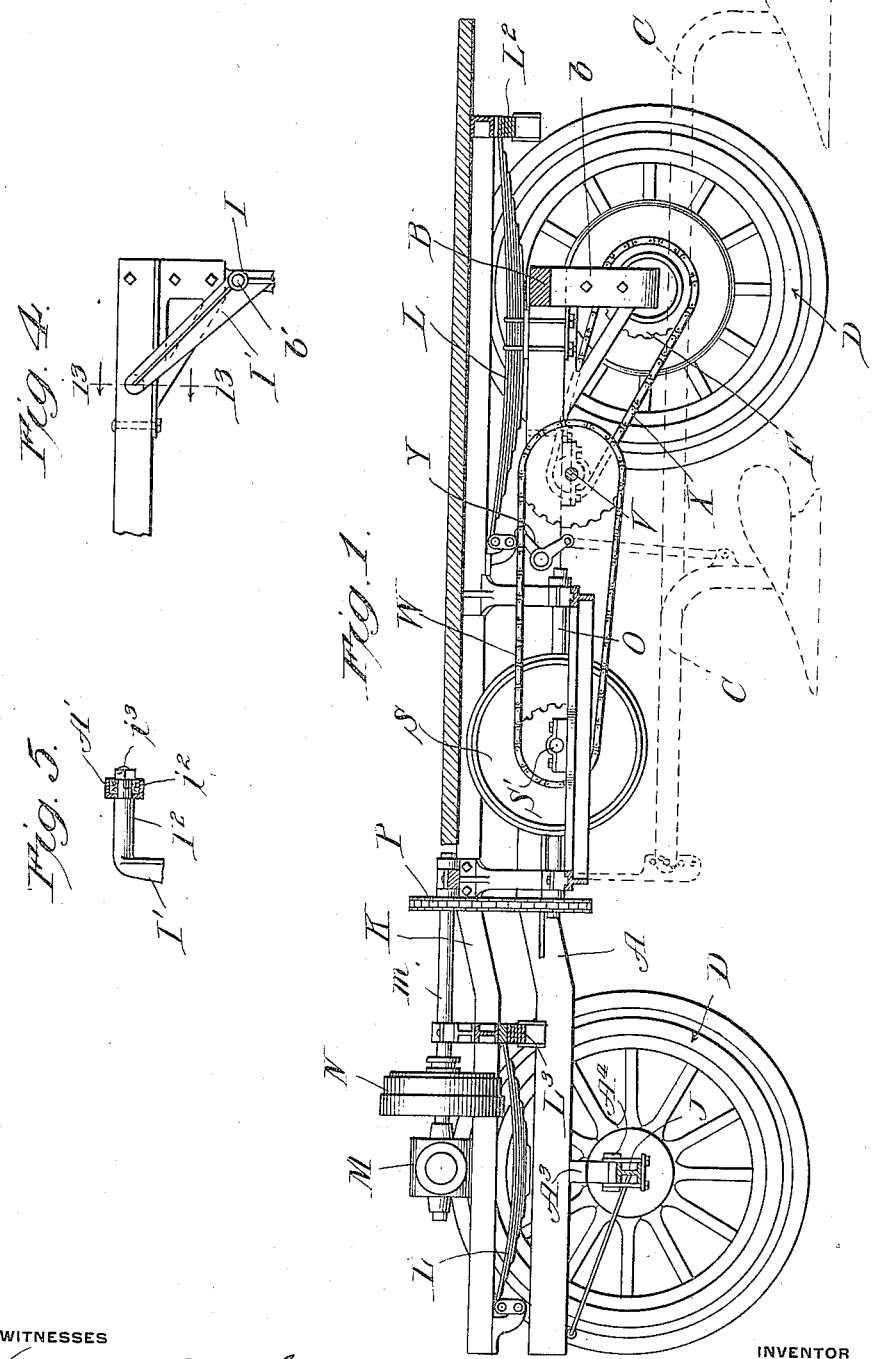
WITNESSES
INVENTOR
Charles W. Clark
by Chamberlin Freudenreich
Attys.

C. W. CLARK.
COMBINED MOTOR TRUCK AND PLOW.
APPLICATION FILED JAN. 6, 1911.
1,080,749.
Patented Dec. 9, 1913.
2 SHEETS—SHEET 2.
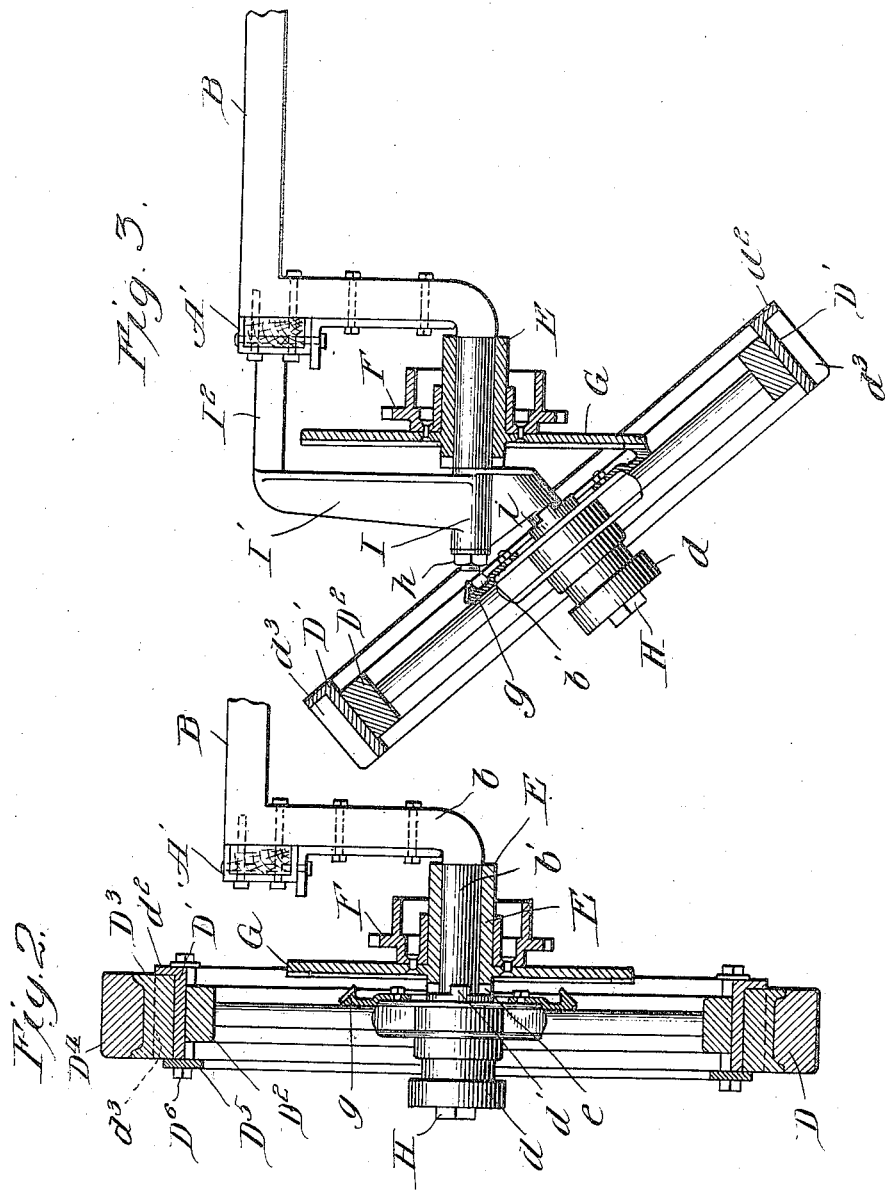

UNITED STATES PATENT OFFICE.

CHARLES W. CLARK, OF CHICAGO, ILLINOIS.

COMBINED MOTOR-TRUCK AND PLOW.

1,080,749. Specification of Letters Patent. Patented Dec. 9, 1913.

Application filed January 6, 1911. Serial No. 601,212.

*To all whom it may concern:*

Be it known that I, CHARLES W. CLARK, a citizen of the United States, residing at Chicago, county of Cook, State of Illinois, have invented a certain new and useful Improvement in Combined Motor-Trucks and Plows, and declare the following to be a full, clear, and exact description of the same, such as will enable others skilled in the art to which it pertains to make and use the same, reference being had to the accompanying drawings, which form a part of this specification.

My invention relates to power in driven vehicles and has for its principal object to produce a simple, strong and durable vehicle which may be used either as a truck or as a traction device for drawing plows.

To this end my invention involves various novel features of construction and arrangement, all of which combine to produce an apparatus of unique characteristics, but which may in some instances be used advantageously independently of each other.

The various features of novelty whereby my invention is characterized will hereinafter be pointed out with particularity in the claims; but, having a full understanding of my invention and of its object and advantages, reference may be had to the following detailed description taken in connection with the accompanying drawings, wherein:

Figure 1 is a central longitudinal section through a truck arranged in accordance with one form of my invention; Fig. 2 is a view on an enlarged scale showing a portion of the rear axle and one of the wheels carried thereby, the wheel and its driving members being shown in section; Fig. 3 is a view similar to Fig. 2, showing the wheel in position for plowing; Fig. 4 is a side view of a fragment of the rear end of the frame, illustrating the manner of securing the attachment for holding the wheel at an angle; and Fig. 5 is a section on line 13—13 of Fig. 4.

Referring to the drawings, A represents a rigid frame supported at its front and rear ends upon wheeled axles, the whole forming a wheeled truck. In accordance with my invention I tie the frame rigidly to the rear axle, so that the rear axle serves as a part of the main frame. As more clearly shown in Fig. 2, the rear axle B has the shape of an inverted U, the yoke being rigidly connected with the side pieces $A^1$. The arms $b$ of the U-shaped axles extend below the body of the frame and are provided with journals $b^1$ at their lower ends; the journals being adapted to receive the rear wheels of the truck. By this arrangement, it will be seen that the clearance between the main portions of the axle and the ground is not limited to the radial dimensions of the wheels, but may be much greater than this dimension. This feature is of importance because in plowing, with the plows hooked on beneath the frame as indicated in dotted lines in Fig. 1 at C, sufficient head room must be allowed to permit the plow to be lifted clear of the ground without interference on the part of the rear axle. By making the axle U-shaped sufficient room is provided for permitting the plows when hung under the axle to be raised and lowered, without making it necessary to use wheels of large diameter. When used as a truck the two rear wheels are of course symmetrically arranged in the usual manner; but when used for plowing, it is necessary that one of the rear wheels be arranged at an angle so as to run in a furrow in the manner usual with wheeled plows. To this end I have so constructed and arranged the parts that the rear wheel D may be quickly and easily adjusted from the upright to the inclined position, or vice-versa, without requiring the use of special tools or the employment of a skilled mechanic. This feature of my invention is most clearly shown in Figs. 2 and 3. On the journal $b^1$, inside of the wheel, is a driving sleeve E which is adapted to revolve freely upon the journal.

F is a sprocket-wheel or other transmission element formed on or rigidly secured to the sleeve. G is a beveled gear also rigidly connected with the sleeve.

The end of the journal passes through the hub $d$ of the wheel and thus revolubly supports the wheel by means of any suitable bearing devices. When the parts are assembled as shown in Fig. 2, the apparatus is ready to be used as a truck, the wheel D being driven in any suitable way from the sleeve E. In the particular arrangement shown, I have provided the sleeve E with a series of notches $e$ in its outer end, these notches being adapted to receive lugs or projections $d^1$ on the inner face of the hub.

In assembling the parts, the wheel is slipped upon the journal until the lugs or projections are seated in the notches, and the retaining nut or cap H is applied, locking the wheel to its driving sleeve. The driving connection is uncoupled by the mere act of taking the wheel off the journal.

When it is desired to transform the truck from a road vehicle into one adapted for plowing, I remove the wheel D and mount it upon a suitable attachment which may be fastened to the truck so as to hold the wheel at the proper angle and at the same time permit it to be driven from the sleeve E. In the arrangement shown, the attachment for supporting the wheel at an angle consists of a sleeve I which may be slipped upon that portion of the journal which normally supports the wheel and be held against axial movement by a nut $h$ on the end of the journal. The sleeve I has a laterally projecting arm $I^1$ which is provided with a finger $I^2$ adapted to be securely locked to some portion of the frame. This locking may conveniently be effected by reducing the free end of the finger $I^2$ as indicated by $i^2$ in Fig. 5, the portion $i^2$ passing through the side frame $A^1$ and being held in place by a nut $i^3$. The sleeve I is provided with a journal $i$ of the same diameter as the member $b^1$ and arranged at the proper angle to give the wheel the desired inclination when the wheel is mounted upon the auxiliary journal. In order to drive the wheel when it is in the inclined position, indicated in Fig. 3, I provide it with a gear member $g$ complementary to the gear G; the parts being so constructed and arranged that when the wheel is mounted upon the attachment the gears G, $g$ are brought into mesh and rotary motion of the driving sleeve E will be transmitted to the wheel. It will thus be seen that the only additional part required for the purpose of transforming the truck from a road vehicle to a plowing machine is the simple attachment which can be placed in position and removed in a very few minutes and without the use of any other tools than a simple wrench.

It may be desired to have a different tread surface on the wheels when plowing than the ordinary rubber tire, which is used for road purposes. I have, therefore, so constructed the wheels that they may be run with rubber tires or with ribbed tread surfaces which will take a good hold upon newly plowed ground. As shown, the main rim $D^1$ is secured about the felly $D^2$ in any suitable manner, the rim being provided along one edge with an annular flange $d^2$ and with a series of ribs $d^3$ extending transversely across the tread surface from this flange. In this condition, which is the one indicated in Fig. 3, the wheel is adapted for plowing.

When using the wheel for road purposes the main rim may be surrounded with an auxiliary rim $D^3$ carrying a suitable tire $D^4$. The auxiliary rim is suitably grooved around its interior so as to provide transverse seats for the reception of the ribs $d^3$. This arrangement insures that there will be no slipping of the auxiliary rim or the main rim. The auxiliary rim may be held against axial displacement by means of a flat ring $D^5$ whose diameter is such that when it is laid beside the wheel it overlaps both the main rim and the auxiliary rim. The retaining ring may be held in place by suitable bolts $D^6$.

At the front end of the truck the side members $A^1$ of the main frame are secured to a bolster $A^3$. The bolster is in turn supported upon the front axle J.

Above the main frame of the truck is an auxiliary frame K which is suitably supported upon springs L, $L^2$ and $L^3$ which are carried by the main frame. The engine and body of the truck are mounted on the auxiliary frame so that the engine and the load carried by the truck are yieldingly supported.

M is a motor mounted on the auxiliary frame at the front of the truck and adapted to be coupled to and uncoupled from a power shaft $m$ by means of a clutch N.

O is an auxiliary driving shaft mounted upon the main frame below and in rear of the shaft $m$. The two shafts are connected together by means of a sprocket chain P which passes over suitable sprocket wheels, although any other suitable driving connection may be employed.

$S^1$ is a transverse shaft adapted to be driven from the shaft O by means of a suitable speed changing device S. The driven shaft $S^1$ may be connected to the driving wheels of the truck in any suitable manner. In the arrangement shown, this shaft is connected to a countershaft V by means of a sprocket-chain W. The countershaft is in turn connected to the driving sprocket-wheel F on the rear axle by means of chains X. It will, of course, be understood that any other desired driving connections may be employed.

The plow is controlled from a lever Y which may be connected to a suitable operating member (not shown) extending to the front of the truck, within reach of the operator, consequently the truck may be run and the plow controlled by a single operator.

While I have described in detail only a single form of truck embodying the various features of my invention, I do not desire to be limited to the particular terms of construction described, but intend covering all forms and arrangements which fall within the terms of my appended claims.

I claim:

1. A truck having an axle provided with a journal to receive a wheel, and an attachment for the axle arranged to support the wheel so as to revolve about an axis at an angle to said journal.

2. A truck having an axle provided at its ends with journals to receive wheels, and an attachment removably secured to the truck for supporting one of said wheels with its axis at an angle to the corresponding journal.

3. A truck having an axle provided with journals to receive wheels, and an attachment arranged to be secured upon one of said journals, said attachment having a wheel receiving journal arranged at an angle to the latter journal when the attachment is secured upon the journal.

4. A truck having an axle provided with journals to receive wheels, an attachment having an opening therein to receive one of said journals, an auxiliary wheel receiving journal on said attachment arranged at an angle to the latter journal, and means for locking said attachment against movement on the axle.

5. A truck having an axle provided with a journal to receive a wheel, a wheel, a driven member revolubly mounted on the axle and having a detachable driving connection with said wheel, an attachment for the axle arranged to support said wheel so as to revolve about an axis at an angle to said journal, and devices on said wheel and on said driven member for transmitting motion from said member to the wheel when the wheel is supported on the said attachment.

6. A truck having an axle provided with a journal to receive a wheel, a wheel, a driven member revolubly mounted on said axle, an attachment for the axle arranged to support the said wheel so as to revolve about an axis arranged at an angle to said journal and coöperating elements on said driven member and on said wheel for causing motion to be transmitted from one to the other both when the wheel is mounted on said journal and when mounted on said attachment.

7. A truck provided with two revoluble driving elements, a wheel, means for supporting said wheel adjacent to said elements so as to revolve either about a horizontal axis or about an axis at an angle to the horizontal, means on said wheel for coöperating with one of said driving elements in one position of the wheel, and means on the wheel for coöperating with the other of said driving elements in the other position of the wheel.

8. In a truck, an axle having at one end a depending portion provided with a laterally-extending trunnion for receiving a wheel, a wheel, a frame rigidly connected to the axle above the trunnion, a driven member revolubly mounted on said trunnion and having a detachable driving connection with said wheel, a sleeve adapted to be mounted on said axle and having a journal for supporting said wheel at an angle to the axis of said trunnion, and an arm for locking said sleeve against rotation extending over said driven member and secured to said frame.

9. A truck provided with a wheel and with means for supporting the wheel so as to revolve either about a horizontal axis or an axis inclined to the horizontal, a motor on said truck, and driving connections from said motor to said wheel for driving the wheel while the latter is supported so as to revolve about the horizontal axis, said driving connection including a clutch one part of which is mounted on the truck and the other part on the wheel, said clutch being so constructed and arranged that the parts will be brought into operative driving relation to each other when the wheel is mounted so as to revolve about the horizontal axis and be disconnected from each other upon shifting the wheel.

In testimony whereof, I sign this specification in the presence of two witnesses.

CHARLES W. CLARK.

Witnesses:
 WM. F. FREUDENREICH,
 HARRY S. GAITHER.